United States Patent
Ramsay et al.

(10) Patent No.: US 10,429,545 B2
(45) Date of Patent: Oct. 1, 2019

(54) SYSTEM, METHOD AND COMPUTER PROGRAM PRODUCT FOR EVALUATING AND RANKING GEOBODIES USING A EULER CHARACTERISTIC

(71) Applicant: Landmark Graphics Corporation, Houston, TX (US)

(72) Inventors: Travis St. George Ramsay, Rosenberg, TX (US); Jeffrey Marc Yarus, Houston, TX (US)

(73) Assignee: Landmark Graphics Corporation, Houston, TX (US)

(*) Notice: Subject to any disclaimer, the term of this patent is extended or adjusted under 35 U.S.C. 154(b) by 861 days.

(21) Appl. No.: 14/440,322

(22) PCT Filed: Dec. 13, 2012

(86) PCT No.: PCT/US2012/069559
§ 371 (c)(1),
(2) Date: May 1, 2015

(87) PCT Pub. No.: WO2014/092713
PCT Pub. Date: Jun. 19, 2014

(65) Prior Publication Data
US 2015/0301224 A1  Oct. 22, 2015

(51) Int. Cl.
*G01V 99/00* (2009.01)
*E21B 43/00* (2006.01)

(52) U.S. Cl.
CPC ............ *G01V 99/005* (2013.01); *E21B 43/00* (2013.01)

(58) Field of Classification Search
CPC ............... G01V 99/005; E21B 43/00
USPC .......................................... 703/2, 10
See application file for complete search history.

(56) References Cited

U.S. PATENT DOCUMENTS

| | | | |
|---|---|---|---|
| 5,757,663 A * | 5/1998 | Lo ............... | E21B 49/00 702/12 |
| 6,313,837 B1 * | 11/2001 | Assa ............ | G06T 17/20 345/420 |
| 6,549,879 B1 | 4/2003 | Cullick et al. | |
| 6,618,678 B1 | 9/2003 | Van Riel | |
| 7,024,021 B2 | 4/2006 | Dunn et al. | |
| 7,079,953 B2 | 7/2006 | Thome et al. | |
| 7,096,172 B2 * | 8/2006 | Colvin .......... | G01V 11/00 702/12 |
| 7,289,942 B2 * | 10/2007 | Yang ............. | E21B 43/16 166/305.1 |
| 7,565,243 B2 | 7/2009 | Kim et al. | |
| 7,584,086 B2 | 9/2009 | Frankel | |
| 7,706,981 B2 | 4/2010 | Wilkinson et al. | |
| 8,078,405 B2 | 12/2011 | Delorme et al. | |

(Continued)

FOREIGN PATENT DOCUMENTS

EP  2113796 A1  11/2009

OTHER PUBLICATIONS

Patent Examination Report dated Jan. 28, 2016 for Australian Patent Application No. 2012396846, 3 pages.

(Continued)

*Primary Examiner* — Juan C Ochoa
(74) *Attorney, Agent, or Firm* — Haynes and Boone, LLP

(57) ABSTRACT

A system and method utilizing a modified Euler Characteristic to numerically quantify and rank connectivity of a geobody within a reservoir model based upon a range of petrophysical properties.

16 Claims, 5 Drawing Sheets

(56) References Cited

U.S. PATENT DOCUMENTS

| | | | |
|---|---|---|---|
| 8,213,261 | B2 | 7/2012 | Imhof et al. |
| 8,271,247 | B2 | 9/2012 | Davidson |
| 8,447,524 | B2* | 5/2013 | Chen .................. G01V 1/345 702/13 |
| 2006/0041409 | A1 | 2/2006 | Strebelle et al. |
| 2006/0235666 | A1* | 10/2006 | Assa .................. G01V 11/00 703/10 |
| 2010/0010796 | A1 | 1/2010 | Hovadik et al. |
| 2010/0057418 | A1 | 3/2010 | Li et al. |
| 2010/0149917 | A1 | 6/2010 | Imhof et al. |
| 2010/0161232 | A1 | 6/2010 | Chen et al. |
| 2010/0161300 | A1* | 6/2010 | Yeten .................. E21B 43/00 703/10 |
| 2010/0274543 | A1 | 10/2010 | Walker et al. |
| 2011/0048731 | A1* | 3/2011 | Imhof .................. G01V 1/345 166/369 |
| 2011/0213600 | A1 | 9/2011 | Strebelle |
| 2011/0218737 | A1 | 9/2011 | Gulati |
| 2011/0264430 | A1 | 10/2011 | Tapscott et al. |
| 2011/0295510 | A1 | 12/2011 | Gulati |
| 2012/0150501 | A1 | 6/2012 | Wu |

OTHER PUBLICATIONS

Renard, et al., "Connectivity Metrics for Subsurface Flow and Transport," Advances in Water Resources, Nov. 23, 2011.

Extended Search Report issued for EP 12890033, dated Jul. 22, 2016, 7pages.

Deutsch, C.; Fortran Programs for Calculating Connectivity of Three-Dimensional Numerical Models and for Ranking Multiple Realizations; Comguters & Geosciences, vol. 24, No. 1, pp. 69-76, 1998.

Lehmann, P., Berchtold, M., Ahrenholz, B., Tölke, J., Kaestner, A., Krafczyk, M., Flühler, H., and Künsch, H. R., Impact of geometrical properties on permeability and fluid phase distribution in porous media, Advances in Water Resources, 31, pp. 1188-1204, 2008.

Pölt, P.; In situ experiments in the ESEM (Environmental Scanning Electron Microscope); Austrian Centre for Electron Microscopy and Nanoanalysis, Retrieved Jun. 5, 2012.

Vogel, H-J., Topological Characterization of Porous Media, In: Morphology of Condensed Matter—Physics and Geometry of Spatially Complex Systems, Mecke, K. and Stoyan, D. (eds), Lecture Notes in Physics, 600, 75-92, 2002.

Zhang, M., Yongjia, H., Ye, G., Lange, D. and van Breugel, K.; Computational investigation on mass diffusivity in Portland cement paste based on X-ray computed microtomography (μCT) image; Construction and Building Materials, vol. 27, Issue 1, pp. 472-281, 2012.

International Search Report and the Written Opinion of the International Searching Authority, or the Declaration, dated Feb. 22, 2013, PCT/US2012/069559, 7 pages, ISA/US.

Hovadik, J. M., and Larue, D. K., Stratigraphic and structural connectivity, In: Reservoir Compartmentalization, Jolley, S. J., Fisher, Q. J., Ainsworth, R. B., Vroluk, P. J., and Delisle, S. (eds), The Geological Society of London, 247, 219-242, 2010.

* cited by examiner

SYSTEM, METHOD AND COMPUTER PROGRAM PRODUCT FOR EVALUATING AND RANKING GEOBODIES USING A EULER CHARACTERISTIC

The present application is a U.S. National Stage patent application of International Patent Application No. PCT/US2012/069559, filed on Dec. 13, 2012, the benefit of which is claimed and the disclosure of which is incorporated herein by reference in its entirety.

FIELD OF THE INVENTION

The present invention relates generally to hydrocarbon reservoir modeling and, more specifically, to a system which utilizes a modified Euler Characteristic to evaluate and rank the connectivity of cell volumes within a reservoir model in order to identify those portions of the modeled reservoir that are economically viable.

BACKGROUND

The economic viability of a conventional reservoir is determined by the abundance and spatial distribution of porosity, as well as permeability. Unconventional reservoirs, on the other hand, typically have poorer porosity and permeability as compared to conventional reservoirs. Such unconventional reservoirs comprise, for example, shale or tight gas sand, or may even possess highly permeable rock types, yet have an egregiously viscous hydrocarbon component that must be mined or aggressively heated to induce flow (i.e., viscosity reduction). In addition, both conventional and unconventional reservoirs are contained by seals (cap rock) of even further diminished petrophysical property.

In view of the foregoing, there is a need in the art for a methodology to distinguish between cells coincident with the interpretation of economic and non-economic reservoir properties. In order to ascertain viable connected reservoir cells over a range of petrophysical properties, user discretion of net reservoir constituents is necessary, which requires well log interpretation and rock physics-based property derivation. Accordingly, the present invention meets these and other needs as described below.

DESCRIPTION OF ILLUSTRATIVE EMBODIMENTS

Illustrative embodiments and related methodologies of the present invention are described below as they might be employed in a system utilizing a Euler Characteristic to evaluate and rank geobody connectivity. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the invention will become apparent from consideration of the following description and drawings.

As will be described below, exemplary embodiments of the present invention address geocellular connectivity in order to distinguish between the flowing and non-flowing conduits existing in saturated subsurface porous media. Flowing conduits consist of porosity and permeability within a range that, for given fluid properties, permit the transport of those fluids. Non-flowing conduits, as a corollary, act as barriers/inhibitors to fluid flow in the rock matrix, although it may possess trapped/immobile hydrocarbons. In this regard, exemplary embodiments of the present invention quantify the static connectivity for a specific petrophysical earth model having grid volumes of porosity and permeability, and use the Euler Characteristic as a ranking tool for connected geocellular bodies of multiple stochastic realizations. In addition, an inverse cumulative distribution function ("ICDF") may be utilized to interpret probabilities of occurrence.

In other words, the present invention topologically assesses the appropriateness of specific static model advancement to dynamic simulation. A modified Euler Characteristic is utilized to enhance the topological assessment by numerical quantifying the connectivity of cells within a static reservoir model over a range of porosity and permeability values. Based on this quantification, the connectedness of disparate earth modeling petrophysical realizations, or geobodies, may be ranked. Thereafter, static determination of optimally connected geobodies is allowed, whereby the resulting geobodies are subjected to fluid flow simulation for further analysis as desired. These and other advantages of the present invention will be readily apparent to those ordinarily skilled in the art having the benefit of this disclosure.

Figure 1:
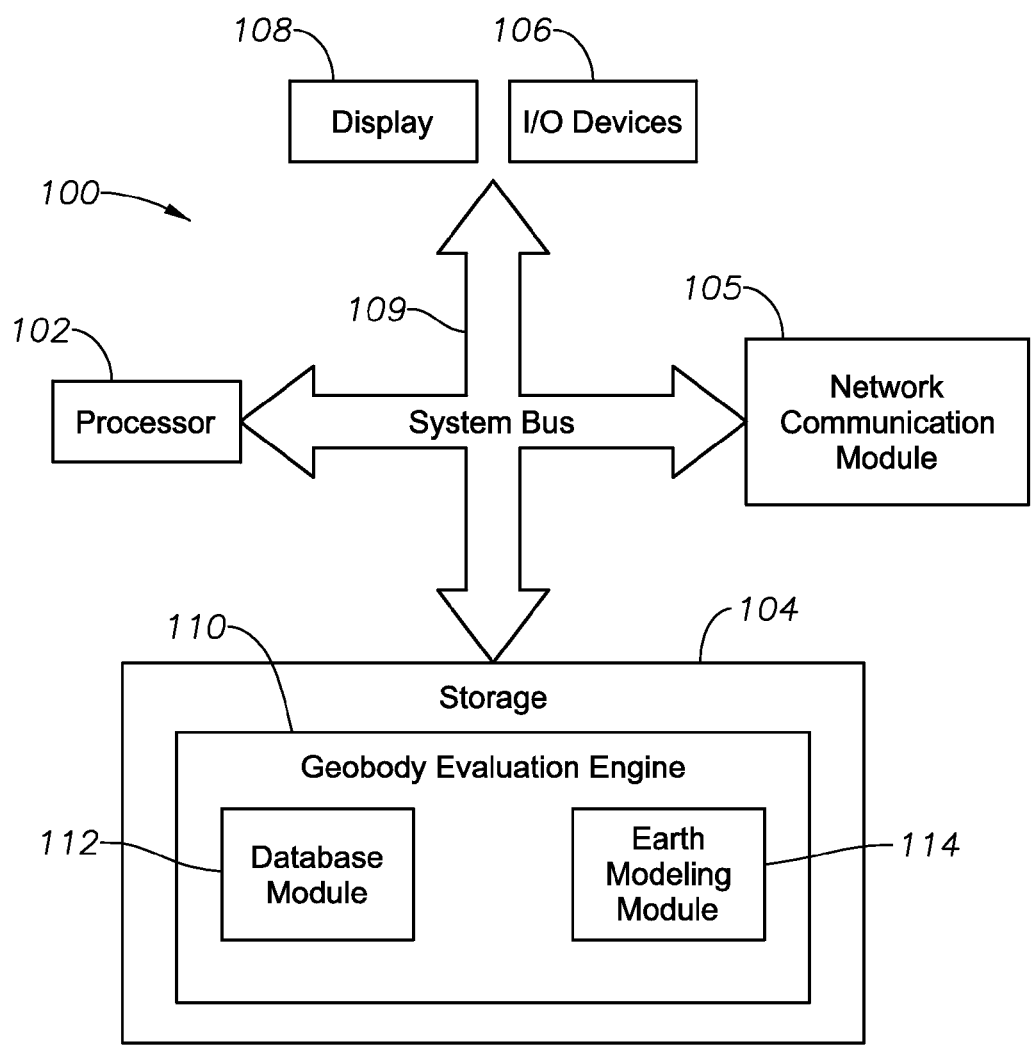
FIG. 1 illustrates a block diagram of a geobody evaluation system according to certain exemplary embodiments of the present invention.

FIG. 1 shows a block diagram of a geobody evaluation system 100 according to certain exemplary embodiments of the present invention. As will be described herein, geobody evaluation system 100 utilizes a connectivity algorithm to generate one or more geobodies (i.e., connected cell volumes) located within an earth model based upon one or more filters relating to rock physics or mechanical rock properties, minimum cell connectivity count, and cell connection geometry. A directional component to the definition of connectivity may be determined between defined pairs of wells (i.e., user-selected injection and production wells, for example), arbitrary geographic direction or orientation with an identified subsurface trend. Once the geobodies have been generated, a Euler Characteristic is utilized to numerically quantify the connectivity of each geobody, and assign a ranking to each geobody accordingly. A dilation and erosion technique may also be utilized to grow or shrink the geobodies, thus further refining the analysis to define not only the size, shape, and orientation, but also internal arrangement and composition. Ultimately, the determined geobodies are presented to a dynamic simulator to model a variety of reservoir operations.

To specify further, exemplary embodiments of the present invention utilize cell connectivity to distinguish net flow permitting pore space from isolated/occluded pore space. The reservoir, or bulk medium, is categorized as containing static conduits of flow and barriers to flow, each being distinguishable by a magnitude of porosity/permeability. Some pore spaces are effectively connected between each other, thus constituting a flow region whereby single and/or multiphase flow is permitted. Barriers may also be interconnected, potentially rendering total obfuscation of a floodable pore space. As such, geobody evaluation system 100 utilizes a connectivity algorithm as described herein to analyze connected cells possessing petrophysical properties in order to assess the net reservoir volume, thus producing one or more reservoir regions of connected bodies, or geobodies, in the context of a porosity or permeability range. Geobody evaluation system 100 then utilizes a modified Euler Characteristic to evaluate and numerically rank those geobodies based upon their cell connectivity, thus identifying a range of geological realizations that include, for example, optimistic, intermediate, and pessimistic geobodies. Accordingly, those geobodies may then be realized in an earth model to simulate various downhole operations.

Referring to FIG. 1, exemplary geobody evaluation system 100 includes at least one processor 102, a non-transitory, computer-readable storage 104, transceiver/network communication module 105, optional I/O devices 106, and an optional display 108 (e.g., user interface), all interconnected via a system bus 109. Software instructions executable by the processor 102 for implementing software instructions stored within geobody evaluation engine 110 in accordance with the exemplary embodiments described herein, may be stored in storage 104 or some other computer-readable medium. Although not explicitly shown in FIG. 1, it will be recognized that geobody evaluation system 100 may be connected to one or more public and/or private networks via one or more appropriate network connections. It will also be recognized that the software instructions comprising geobody evaluation engine 110 may also be loaded into storage 104 from a CD-ROM or other appropriate storage media via wired or wireless methods.

Moreover, those ordinarily skilled in the art will appreciate that the invention may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The present invention may therefore, be implemented in connection with various hardware, software or a combination thereof in a computer system or other processing system.

Still referring to FIG. 1, in certain exemplary embodiments, geobody evaluation engine 110 comprises database module 112 and earth modeling module 114. Database module 112 provides robust data retrieval and integration of historical and real-time reservoir related data that spans across all aspects of the well planning, construction and completion processes such as, for example, drilling, cementing, wireline logging, well testing and stimulation. Moreover, such data may include, for example, logging data, well trajectories, petrophysical rock property data, mechanical rock property data, surface data, fault data, data from surrounding wells, data inferred from geostatistics, etc. The database (not shown) which stores this information may reside within database module 112 or at a remote location. An exemplary database platform is, for example, the INSITE® software suite, commercially offered through Halliburton Energy Services Inc. of Houston Tex. Those ordinarily skilled in the art having the benefit of this disclosure realize there are a variety of software platforms and associated systems to retrieve, store and integrate the well related data, as described herein.

Still referring to the exemplary embodiment of FIG. 1, geobody evaluation engine 110 also includes earth modeling module 114 to integrate with the data contained within database module 112 in order to provide subsurface stratigraphic visualization including, for example, geo science interpretation, petroleum system modeling, geochemical analysis, stratigraphic gridding, facies, net cell volume, and petrophysical property modeling. In addition, earth modeling module 114 models well paths, as well as cross-sectional through the facies and porosity data. Exemplary earth modeling platforms include DecisionSpace®, which is commercially available through the Assignee of the present invention, Landmark Graphics Corporation of Houston, Tex. However, those ordinarily skilled in the art having the benefit of this disclosure realize a variety of other earth modeling platforms may also be utilized with the present invention.

Moreover, geobody evaluation engine 110 may also include multi-domain workflow automation capabilities that may connect any variety of desired technical applications. As such, the output from one application, or module, may become the input for another, thus providing the capability to analyze how various changes impact the well placement and/or fracture design. Those ordinarily skilled in the art having the benefit of this disclosure realize there are a variety of workflow platforms which may be utilized for this purpose.

Referring to FIGS. 2A-2E, exemplary methodologies of the present invention will now be described. At block 202, processor 102, via geobody evaluation engine 110 detects entry of one or more filters defined using a characteristic of a desired geobody. Such geobody characteristics may be, for example, related to petrophysical, mechanical, geometric, or volumetric properties. The filters may be entered, or defined, via a user interface (display 108 and I/O device 106, for example), as understood in the art. In an exemplary embodiment, the filters may define (1) a numerical range of porosity values that cells within the reservoir grid must meet to be eligible to form part of a geobody, (2) a numerical range of permeability values cells must meet in order to be eligible to form part of the geobody, (3) a minimum number or total pore volume of connected cells that a geobody must have, and (4) a required cell connection geometry for the geobodies.

Regarding exemplary filters (1) and (2), geobody evaluation system 100 utilizes the specification of respective porosity and permeability ranges for the interrogation of cell connectivity in an earth model in order to identify and isolate those geobodies having reservoir properties that are to be exploited. Exemplary porosity/permeability ranges may include, for example, porosity in the range of 0.25 pore units (or 25%) to 0.35 pore units (or 35%), or permeability in range of 200 mD (milli-Darcy) to 1.5 D (Darcy), as will be readily understood by those ordinarily skilled in the art having the benefit of this disclosure. In other exemplary embodiments, geobody evaluation system 100 may also utilize specifications of other properties to determine connectivity, such as, for example, facies, TOC, brittleness, Poisson's ratio, or any individual or combination of indicator or continuous variable (e.g., mechanical, petrophysical, or lithotype), as would be understood by those same skilled persons.

As reflected in filter (3), another exemplary specification is that of the minimum connected cell count or total pore volume necessary to constitute a geobody. As previously described, as a result of the porosity/permeability filter, isolated sets of range inclusive geobodies may be created. In such embodiments, if those geobodies are separated by an impermeable barrier (remaining truly isolated), they would not contribute to fluid flow (or oil and gas production). In addition, such geobodies are likely to be very trivial in fluid volume. To remedy such erroneous creation of isolated reservoir geobodies, certain exemplary embodiments of geobody evaluation system 100 utilize a minimal connected cell count or total pore volume constraint as a filter to exclude small-isolated geobodies from the selection process and, thus, prevent them from hindering proper assessment of grid connectivity. For example, a 100 cell threshold may be utilized as the filter and, in such case, those connected cell volumes having less than 100 cells are discarded. In another example, a volume of $8.2 \times 10^6$ m3 (cubic meters) may be used as the geobody filter, in such case, those connected cells with total pore volume having less than $8.2 \times 10^6$ m3 are discarded. Accordingly, through entry of this filter, geobody evaluation system 100 analyzes the reservoir grid to determine those geobodies comprised of cells in the amount of the minimum connected cell constraint, by count or total pore volume. In those embodiments wherein the porosity/permeability filter is also entered, cells recognized by processor 102 as possessing porosity/permeability within the given range yet lacking sufficient cell connectivity as per the minimum cell constraint are considered non-net reservoir (i.e., will not be selected as geobodies).

Still referring to block 202, using a fourth exemplary filter, the connected cells may be defined in terms of their geometry. As understood in the art, conjoined cells in a reservoir model grid may be connected by vertices, edges and faces. The geometric grid is typically stacked in rectilinear/structured sets—i.e. in Cartesian or pseudo-Cartesian space, accounting for stratigraphy and displacement attributed to faulting. To illustrate this feature, FIG. 2B illustrates an exemplary cell 220 being comprised of six faces 222, twelve edges 224 and eight vertices 226 (or corner-point connections). The stacked cell connectivity to be utilized by geobody evaluation engine 110 is then determined by defining how or if adjacent faces 222, edges 224 and vertices 226 are connected to one another in the entire volume or specified three-dimensional zone of interest. For example, the defined filter may require that only edges and vertices be connected, thus those cells not so connected are discarded. However, in other embodiments, one or more geometrical connectivity filters may be utilized alone or in combination. The function and operation of such geometric connectivity algorithms will be understood by those ordinarily skilled in the art having the benefit of this disclosure. Once the cell geometry has been defined, processor 102 utilizes earth modeling module 114 to traverse the reservoir grid by incrementing along the X axis, then incrementing along the Y axis and then by incrementing along the Z axis cell by cell, establishing whether the necessary cell connections exist, as will be understood by those persons ordinarily skilled in the art having the benefit of this disclosure.

Therefore, subsurface cell connections may be manifested as face-to-face, edge-to-edge and vertex-to-vertex. To illustrate this feature, FIG. 2C demonstrates stacked cells 220 and their interconnectedness that would be assessed for a central cell (i,j,k) within a reservoir grid, as described in Deutsch, C.; *Fortran Programs for Calculating Connectivity of Three-Dimensional Numerical Models and for Ranking Multiple Realizations*; Computers & Geosciences, Vol. 24, No. 1, pp. 69-76, 1998). In certain exemplary embodiments of geobody evaluation system 100, connectivity may be determined from any permutation or exclusive implementation of face, edge or vertex based connectivity between cells 220 within a given volume of the reservoir grid. FIG. 2D illustrates three exemplary respective geometric connectivity methods for cells 220, A showing face-to-face, B showing edge-to-edge, and C showing vertices-to-vertices, as described in Zhang, M., Yonigjia, H., Ye, G., Lange, D. and van Breugel, K.; *Computational investigation on mass diffusivity in Portland cement paste based on X-ray computed microtomography (µCT) image*; Construction and Building Materials, Vol. 27, Issue 1, pp. 472-481, 2012). The connectivity algorithm and connection configurations utilized by processor 102 to achieve this functionality may be, for example, those as described in Deutsch, C.; *Fortran Programs for Calculating Connectivity of Three-Dimensional Numerical Models and for Ranking Multiple Realizations*; Computers & Geosciences, Vol. 24, No. 1, pp. 69-76, 1998. However, those ordinarily skilled in the art having the benefit of this disclosure realize there are a variety of other connectivity methodologies which may be utilized with the present invention.

Figure 2A:
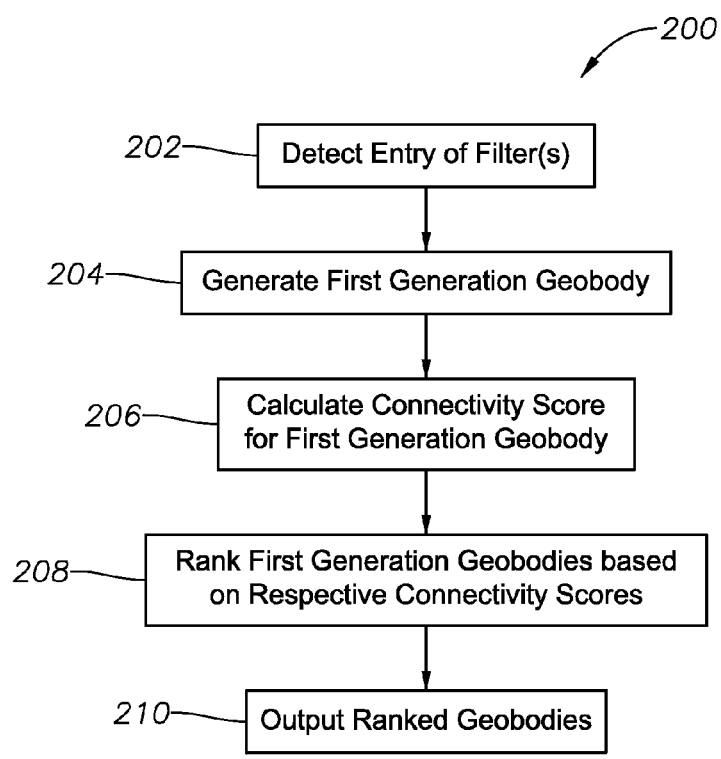
FIG. 2A illustrates a method for ranking a plurality of geobodies according to certain exemplary methodologies of the present invention.
Figure 2B:
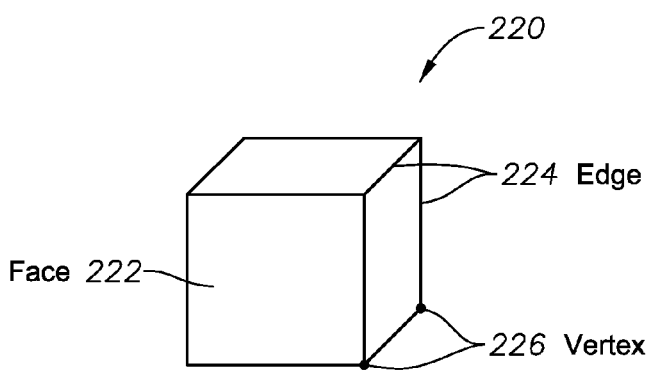
FIG. 2B is an exemplary cell contained within a geological grid of a reservoir model, for illustration purposes.
Figure 2C:
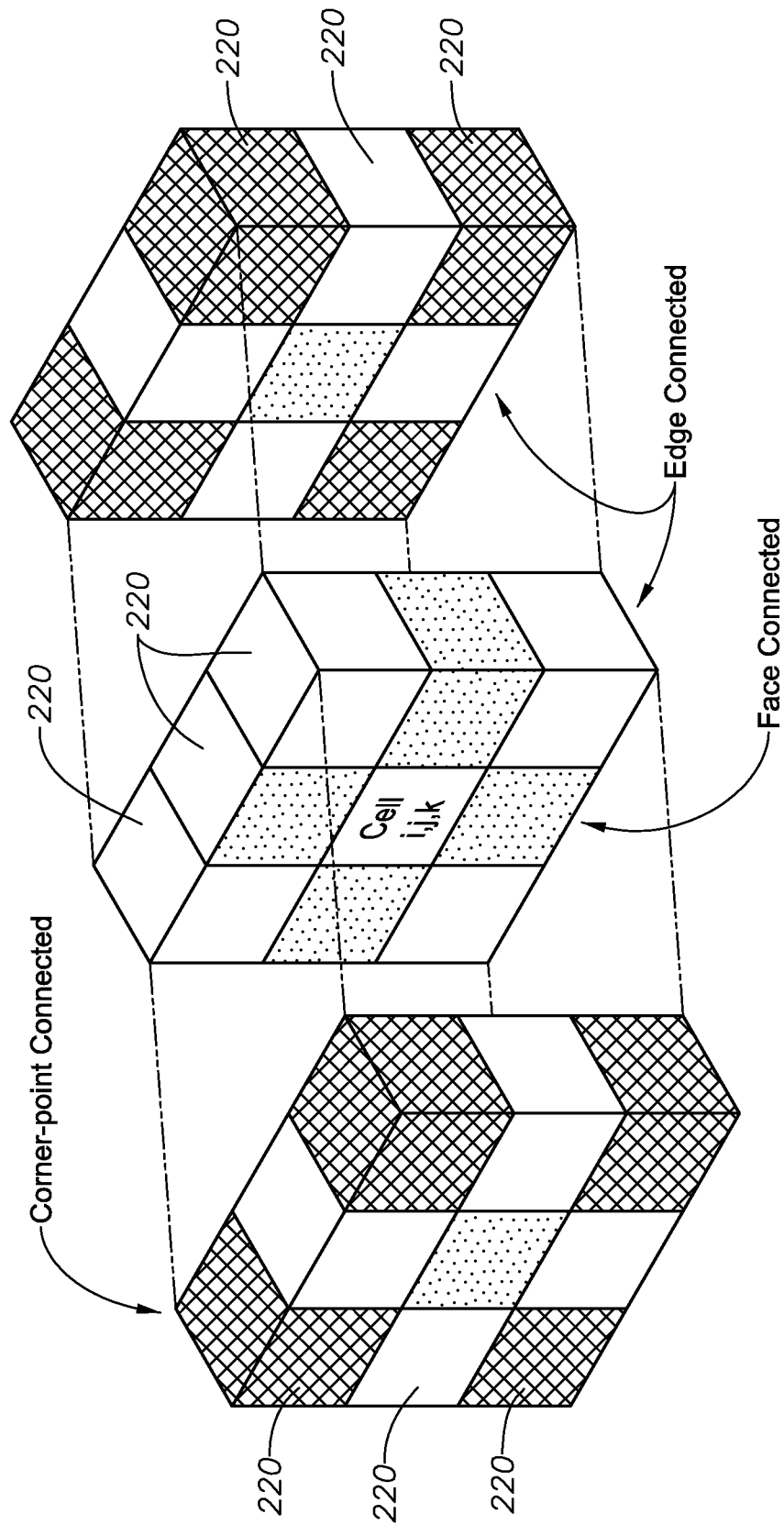
FIG. 2C is a series of stacked cells contained within a geological grid of a reservoir model, for illustration purposes.
Figure 2D:
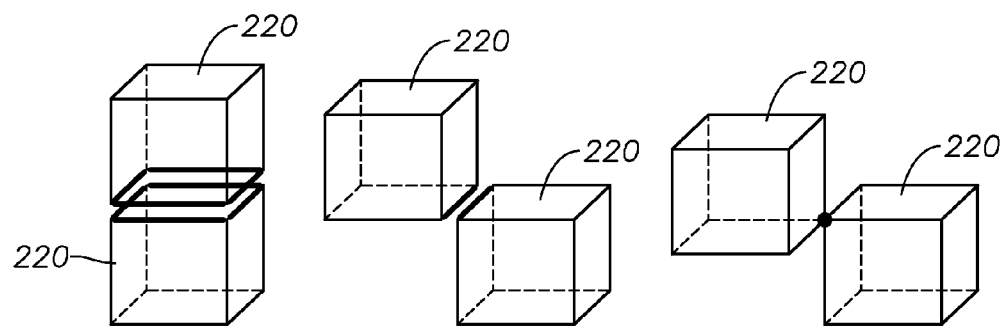
FIG. 2D is an illustration of exemplary geometric cell connections, for illustration purposes.
Figure 2E:
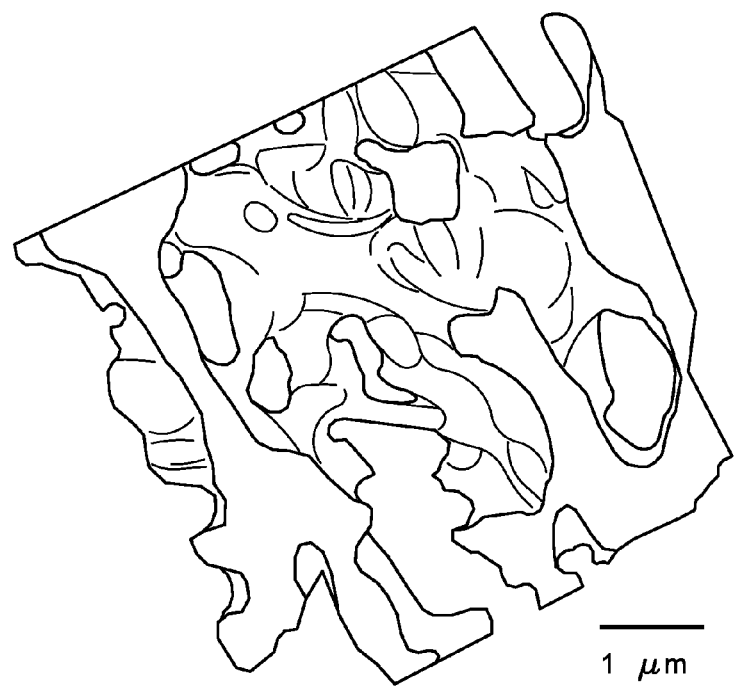
FIG. 2E illustrates a connected subset pore scale (micrometers) volume derived from segmentation of Environmental Scanning Electron Microscope images, for illustration purposes.

Still referring to block 202 of FIG. 2A, once entry of one or more of the filters described herein are detected by geobody evaluation system 100, geobody evaluation engine 110 generates one or more first generation geobodies based upon the defined filters. To do so, geobody evaluation system 100 assigns a new index (a unique numerical value) to those cells comprising the characteristic properties expressed by the user (i.e., filters). After the index is assigned to the qualifying cells, geobody evaluation engine 110 makes each cell part of a connected net reservoir group (or, geobody). In those instances where two disparately indexed geobody groups are determined to be connected, geobody evaluation engine 110 re-indexes geobody groups to become a part of the same geobody numerical index. The end result is a collection of geobodies and remaining non-net reservoir cells. FIG. 2E illustrates an exemplary connected pore volume index for a membrane at micro-meter scale (obtained through microCT segmentation, for example), with the non-connected field being omitted from the display, as described in Pölt, P.; *In situ experiments in the ESEM (Environmental Scanning Electron Microscope)*; Austrian Centre for Election Microscopy and Nanoanalysis, Retrieved Jun. 5, 2012). For a thoroughly homogeneous structure, it is expected that a solitary geobody would exist for the given earth model. However, earth models characterized by more heterogeneity are expected to contain multiple collections of potential net reservoir, as will be understood by those ordinarily skilled in the art having the benefit of this disclosure.

At block 206, geobody evaluation engine 110 then calculates a connectivity score for each of the first generation geobodies. In one exemplary embodiment, a Euler Characteristic is utilized to assign a numerical quantification to each geobody correlating to a rock physics or mechanical rock property. As will be understood by those ordinarily skilled persons having the benefit of this disclosure, a Euler Characteristic is a non-dimensional number that may be negative or positive. It is defined as:

$$\chi(G):=V-E+F \qquad \text{Eq. (1)},$$

where, in the classical terms of a well-defined porous medium G, V is defined as the number of connected components of G (pores), E is the number of tunnels in G (number of redundant connections within the pore space), and F is the number of enclosed cavities (occluded pore space), as described in Vogel, H. J.; *Topological Characterization of Porous Media*; in K. R. Mecke, D. Stoyan (Eds.), LNP 600, pp. 75-92, 2002. Conventional application of Euler Characteristic takes place in binary porous media systems or pore network models, which are systems defined as either pore (with established pore throat connections) or solid, uncommon to that present in reservoir simulations whereby a given pore space may be intermediate in its porosity, thus not truly qualifying as a pore or solid, but somewhere possessing varying degrees of solid and void space.

Accordingly, to remedy this shortcoming of conventional approaches, certain exemplary embodiments of the present invention as described herein produces a quasi-binary reservoir system that is comprised of connected and non-connected pore spaces defined by petrophysical data cutoffs (filters, as previously described). To achieve this quasi-binary system, one or more exemplary embodiments of the present invention utilize a modified Euler Characteristic. To describe the modified Euler Characteristic, again note that the geobodies defined by the applied static connectivity filters (block 202) act as the connected pore space in the Euler equation. Thus, V is now expressed as:

$$\{\forall \varphi, K | g_0 < \varphi < g_1, f_0 < K < f_1;\ g(0,1), f \in S;\ S \in R^1\} \qquad \text{Eq. (2)}$$

, with $\varphi$ defined as the porosity, K defined as the permeability, g and f are real porosity and permeability value ranges defined by the user in the static connectivity filter for the static grid S. The minimum count and total pore volume of connected cells defined in the filter is expressed as:

$$\min_{i \in G} \Sigma i \qquad \text{Eq. (3a)}$$

and $$\min_{i \in G} \Sigma v(i) \qquad \text{Eq. (3b)},$$

where G is the static model, i is an individual cell in G and v(i) is the total pore volume of an individual cell in G. The cell connection constraint is governed by, for example, 6, 8, 12, 14, 18, 20 or 26 point geometrical cell connections established by permutations of face, edge and vertex connectivity in the volume. Geobody evaluation engine 110 assesses the redundant connections during the static connectivity process (block 204). Geobody evaluation engine 110 considers connections to be redundant when least one dependent connection exists that allows fluid entry and exit from a cell (i.e. mass is conserved and non-dependent connections are redundant). An abundance of redundant connections is therefore interpreted as healthy connectedness of the volume.

The final term in the Euler Characteristic (Eq. (1)) is the occluded non-solid reservoir space, represented as an F, which is the portion of porosity omitted by the petrophysical constraint of the static connectivity filter. The cell(s) found to be isolated are then included in the assessment of reservoir connectivity. However, in an alternative embodiment, the isolated cell(s) may also be treated as a solid rock matrix (i.e. omitted per the defined filter, thus indicating it does not participate in flow)—which is dependent on the defining capillary pressure and relative permeability that may be assigned to the cells during dynamic flow simulation in a numerical reservoir simulator.

Still referring to block 206 of FIG. 2A, utilizing the modified Euler Characteristic as defined above, geobody evaluation engine 110 calculates and assigns a numerical quantification indicating the connectivity for each geobody ("connectivity score"). In an exemplary embodiment, largely connected geobodies are attributed with a more negative Euler Characteristic, while the opposite exists for less connected geobodies. For example, a largely connected geobody may be assigned a connectivity score of −2500, an intermediate connected geobody assigned a connectivity score of −0.45, and a poorly connected geobody assigned a connectivity score of 2500, depending on the volume of the initial reservoir grid and the determined geobodies, respectively.

As will be understood by those ordinarily skilled in the art having the benefit of this disclosure, when the modified Euler Characteristic is normalized by volume it yields the Euler Number—i.e. a numerically quantified connectivity without the effect of the volume. In such embodiments, the connected portions of porosity constitute the flow region while the solid matrix, or zones possessing an excessively high entry pressure, act as barriers to flow and thus connectivity. The same is analogous to porosity and permeability cutoffs in the reservoir which delineate the flow region of the reservoir. Thus, this feature of the present invention accounts for the understanding that, while petrophysical property realizations may be equiprobable in their gross spatial distribution of porosity and permeability, the actual flow region(s) constituted by rock type spatial distribution/ placement and inter-connection should be analyzed in isolation with respect to a solitary grid.

Therefore, by quantifying static connectivity, it is possible to rank petrophysical property realizations in terms of that connectivity, which is described by porosity and permeability cutoffs in the net reservoir. Accordingly, at block 208, geobody evaluation engine 110 ranks the first generation geobodies in relation to one another based on their connectivity scores. The ranked geobodies may then be output at block 210 and/or presented to a dynamic simulator for modeling of a variety of reservoir applications such as, for example, as a target for well planning or well drilling. Geobody evaluation system 100 may output the geobodies in a variety of forms such as, for example, positioning each geobody within a 3D earth model or textual description.

In an alternative methodology, geobody evaluation system 100 may also utilize the ranked geobodies to determine the probability of locating a third geobody that is similar to one or more of the ranked geobodies. Here, for example, geobody evaluation engine 110 may utilize an ICDF to determine P10, P50 and P90 probabilistic realizations. It should be noted that the most likely realization defined by static connectivity may differ from that based on static volumetric calculations. Due to the petrophysical property realizations being equiprobable, large variations of in-place fluids are not expected in most examples. This leads to minor variations in the computed in-place fluids. In such exemplary methodologies, the modified Euler Characteristic is utilized to measure the effect of petrophysical property spatial distribution between specific wells and throughout the entire reservoir model, which varies more widely from realization to realization. Thus, through use of the present invention, the modified Euler Characteristic may be used in conjunction with traditional static volumetric ranking methods to further rank multiple stochastic realizations generated from traditional earth modeling processes.

Figure 3:
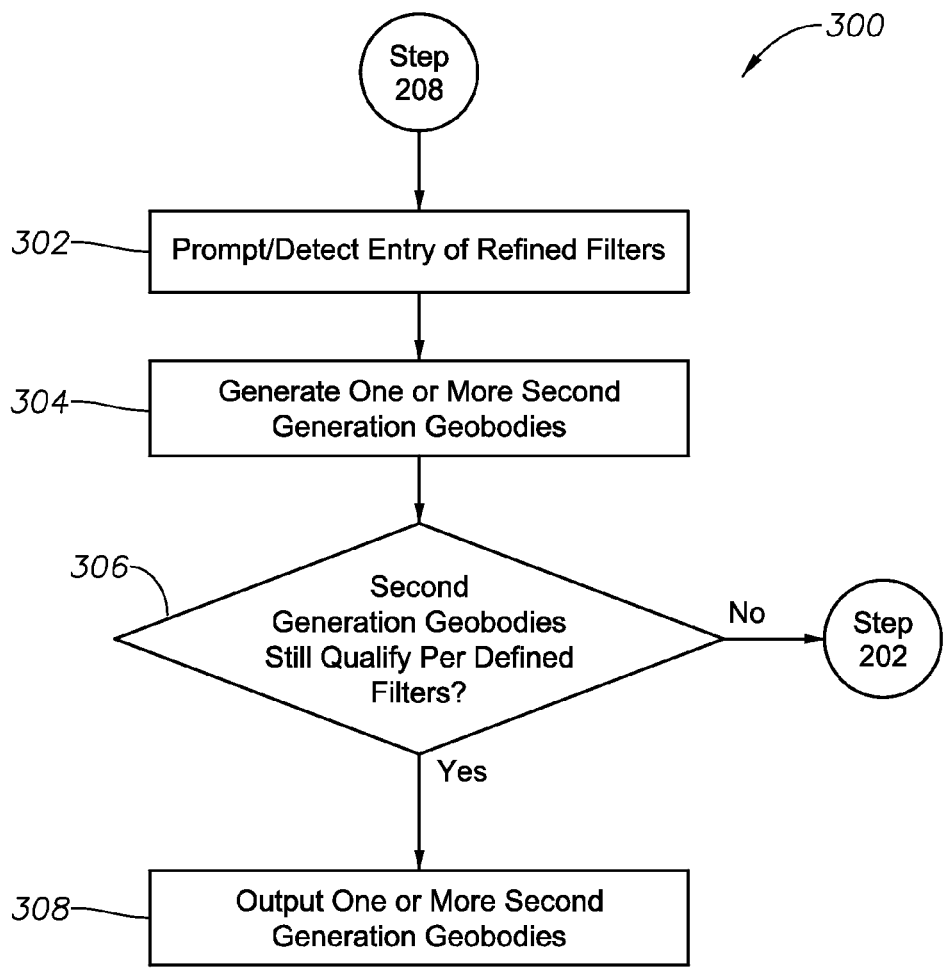
FIG. 3 illustrates an exemplary method for producing geobodies according to prescribed filtering criteria and then subsequently ranked using certain exemplary methodologies of the present invention.

FIG. 3 is flow chart illustrating yet another exemplary methodology perform using one or more embodiments of the present invention. Methodology 300 begins at block 208 of the methodology described in relation to FIG. 2A above. After ranking of the one or more first generation geobodies, geobody evaluation engine 110 prompts a user via the interface to enter one or more refined filters at block 302. The refined filters (as described previously) may loosen or restrict the connectivity requirements necessary for cells to form geobodies. In the alternative, however, geobody evaluation engine 110 may utilize an iterative loop to continuously monitor the system for entry of refined filters. In either embodiment, geobody evaluation engine 110 utilizes a dilation/erosion technique to refine any of the rock property, the minimum cell constraint and/or topology. Here, dilation/erosion would be used to determine potential agglomeration (e.g., expansion or shrinkage) of disparate geobodies through connectivity via cells lacking the pass criterion of the petrophysical filters. Thus, the present invention takes into account the assumption that, for spatially distinct geobodies, the uniqueness of distinct geobodies may be entirely trivial if the amount of cells separating them is very low (topological consideration) or if flow is expected to occur in the particular system due to effects of capillarity (dynamic consideration).

Upon specifying a refined petrophysical filter, geobody evaluation engine 110 uses the dilation/erosion technique to determine if cell volumes adjacent the geobodies are actually conjoined solitary volumes with petrophysical heterogeneity. As a result, the geobodies may be expanded or shrunk. To achieve this functionality, a volume of examination criterion, possessing dimensions defined by height, width and length, would be specified by a user of the system. Geobody evaluation engine 110 would then utilize the examination volume to search adjacent, but non-connected geobody(ies) or cells, residing proximal to a given geobody within the reservoir grid. Should a connection be established through the volume of examination, the geobody evaluation engine 110 determines that the respective geobodies are conjoined as a solitary geobody. Thereafter, at block 304, geobody evaluation engine 110 proceeds with the erosion process to reconfigure/re-index those geobodies determined to be connected as a solitary unique geobody (i.e. aggregating the net reservoir volume, and subsequently deleting the volume of examination), also referred to as the creation of second generation geobodies. Those ordinarily skilled in the art having the benefit of this disclosure will realize there are a variety of dilation/erosion techniques which may be employed herein.

At block 306, geobody evaluation engine 110 then re-analyzes the one or more second generation geobodies to determine if they still meet the requirements defined by the filters entered at block 202. However, in the alternative, geobody evaluation engine 110 may also utilize an iterative loop to continuously monitor the system for input of refined filter parameters. In such alternative embodiments, geobody evaluation engine 110 would determine if the second generation geobodies meet the definition of the newly inputted filters. Nevertheless, if at block 306 it is determined that one or more of the geobodies do not meet the filter criteria, the algorithm loops back to step 202. However, for those geobodies that do meet the filter criteria, the algorithm goes on to block 308 wherein the geobodies are output as previously described.

In one or more alternate embodiments of the present invention, geobody evaluation engine 110 may also evaluate and determine the inlet to outlet static connections between an injector/producer well pair that is connected through determined geobodies. Enforcing inlet/outlet conditions provide a process by which connectivity can be assessed with the a priori assumption of potential communication between wells. Such exemplary embodiments would permit the determination of dependent connectivity from a source to a sink, much like a streamline. Independent connectivity would remain as defined previously by the filtered petrophysical, volumetric and geometrical components. However, in this alternative embodiment, the injector well would act as a start point and the producer as the end point. Geobody evaluation engine 110 would then initiate the previously described connectivity algorithms from the injection well, as opposed to simply following the increasing X, Y and Z coordinates in the grid. In addition, such an embodiment would allow for the combined analysis of interpreted well test permeability and earth modeled interpreted flow regions based primarily on petrophysical analysis.

The foregoing methods and systems described herein are particularly useful in planning, altering and/or drilling wellbores. As described, the system utilizes a connectivity algorithm to generate geobodies within a static reservoir simulation based upon one or more defined filters. Those geobodies are then assigned a range of porosity and permeability related numerical scores and ranked using a modified Euler Characteristic. Accordingly, based upon the ranked geobodies output by the system, a wellbore location may be planned using a ranked geobody as the target, an existing wellbore may be deviated in real-time and/or further operations may be altered. In addition, well equipment may be identified and prepared based upon the well placement or stimulation plan, and the wellbore is drilled, stimulated, altered and/or completed in accordance to the well placement or stimulation plan.

The present invention provides a variety of advantages. First, time and money may be saved by gaining an understanding of reservoir flow regions earlier, through their petrophysical properties, and in conjunction with dynamic property modeling. Second, static models may be refined based upon determined communication between wells and sector/regional fluid displacement exclusively using static properties. Third, the static earth model may be adjusted to be consistent with production data. Fourth, fine tuning of the static model is encouraged before flow simulation, thus reducing the necessity to introduce porosity/permeability modifiers in the model during history match. Fifth, effective permeability may potentially be computed using flow simulation or the Kozeny-Carman equation as an estimation, and then comparing the results to formation permeability and fluid storage capacity. Sixth, history matching is more accurate, thus honoring geostatistics and production data. Lastly, connectivity quantification and ranking of earth models is provided.

An exemplary methodology of the present invention provides a computer-implemented method to evaluate a geobody, the method comprising detecting entry of one or more filters defined using one or more characteristics of a desired geobody; generating a plurality of first generation geobodies based upon at least one of the filters; calculating a connectivity score for each first generation geobody using a Euler Characteristic; and ranking the first generation geobodies in relation to one another based on their connectivity scores. In another exemplary method, the connectivity score calculated using the Euler Characteristic indicates numerical ranges of rock physics or mechanical rock properties. Yet another method further comprises determining an inlet to outlet connection between an injector/producer well pair that is connected through the first generation geobodies. In another method, the filters comprise at least one of a range of porosity for a cell forming part of the first generation geobodies; a range of permeability for a cell forming part of the first generation geobodies; a minimum number of connected cells for the first generation geobodies; or a cell connection geometry for the first generation geobodies.

Another exemplary method further comprises utilizing the first generation geobodies to determine a probability of locating a third geobody that is similar to one or more first generation geobodies. In another, the method further comprises detecting entry of one or more refined filters; and generating at least one second generation geobody based upon the refined filters. In another, generating the second generation geobody further comprises generating a first volume of cells based upon the refined filters; and performing a dilation/erosion technique to determine if the first volume of cells should be expanded or shrunk; and generating a second volume of cells based upon the determination of whether the cells should be expanded or shrunk, wherein the second volume of cells is the second generation geobody. In yet another, the first or second generation geobodies are utilized as a target for a wellbore drilling operation.

An alternative exemplary methodology of the present invention provides a computer-implemented method to evaluate a geobody, the method comprising detecting entry of a filter defined using a characteristic of a desired geobody; generating a first generation geobody based upon the filter; and calculating a connectivity score for the first generation geobody using a Euler Characteristic. In another, generating the first generation geobody further comprises generating a plurality of first generation geobodies, the method further comprising ranking the plurality of first generation geobodies in relation to one another based on their connectivity scores. In another, the connectivity score calculated using the Euler Characteristic comprises numerical ranges of rock physics or mechanical rock properties. Yet another method further comprises determining an inlet to outlet connection between an injector/producer well pair that is connected through a plurality of generation geobodies. Another method further comprises detecting entry of a refined filter and generating a second generation geobody based upon the refined filter. In yet another, the first or second generation geobody is utilized as a target for a wellbore drilling operation.

Furthermore, the exemplary methodologies described herein may be implemented by a system comprising processing circuitry or a computer program product comprising instructions which, when executed by at least one processor, causes the processor to perform any of the methodology described herein.

Although various embodiments and methodologies have been shown and described, the invention is not limited to such embodiments and methodologies and will be understood to include all modifications and variations as would be apparent to one skilled in the art. Therefore, it should be understood that the invention is not intended to be limited to the particular forms disclosed. Rather, the intention is to cover all modifications, equivalents and alternatives falling within the spirit and scope of the invention as defined by the appended claims.

What is claimed is:

1. A computer-implemented method to evaluate a geobody, the method comprising:
   receiving an earth model comprising a plurality of cells;
   receiving entry of one or more filters directed to one or more characteristics of a desired geobody;
   determining porosity and/or permeability values for each pair of cells of the earth model;
   identifying pairs of cells with porosity and/or permeability values above a threshold value;
   generating a plurality of first generation geobodies, each of the first generation geobodies comprising at least one pair of cells with a porosity and/or permeability value above the threshold value;
   filtering the plurality of first generation geobodies to remaining first generation geobodies by eliminating first generation geobodies with a cell count lower than a threshold cell count;
   calculating a connectivity score for each of the remaining first generation geobodies by using a Euler Characteristic, wherein the Euler Characteristic is associated with the porosity and/or permeability values of the first generation geobodies;
   ranking the remaining first generation geobodies in relation to one another based on their connectivity scores; and
   outputting the ranked remaining first generation geobodies.

2. A computer-implemented method as defined in claim 1, wherein the connectivity score calculated using the Euler Characteristic indicates numerical ranges of rock physics or mechanical rock properties.

3. A computer-implemented method as defined in claim 1, further comprising determining an inlet to outlet connection between an injector and producer well pair that is connected through the remaining first generation geobodies.

4. A computer-implemented method as defined in claim 1, further comprising:
   identifying pairs of cells lacking required connection geometry.

5. A computer-implemented method as defined in claim 1, wherein the outputting the ranked remaining first generation geobodies comprises generating a three-dimensional earth model comprising the remaining first generation geobodies and a ranking indication for each of the remaining first generation geobodies.

6. A computer-implemented method as defined in claim 1, further comprising:
   receiving entry of one or more refined filters; and
   generating at least one second generation geobody based upon the refined filters.

7. A computer-implemented method as defined in claim 6, wherein generating the at least one second generation geobody further comprises:

generating a first volume of cells comprising one or more cells that meet a criteria of the refined filters;

performing a dilation and/or erosion technique to determine if the first volume of cells should be expanded or shrunk; and generating a second volume of cells based upon the determination of whether the first volume of cells should be expanded or shrunk, wherein the second volume of cells is the at least one second generation geobody.

8. A computer-implemented method as defined in claim 6, wherein the first or the at least one second generation geobodies are utilized as a target for a wellbore drilling operation.

9. A system comprising processing circuitry to implement the method in claim 1.

10. A non-transitory computer readable medium comprising computer readable instructions which, when executed by at least one processor, causes the processor to perform the method in claim 1.

11. A computer-implemented method to evaluate a geobody, the method comprising:

receiving an earth model comprising a plurality of cells;

receiving entry of a filter directed to a characteristic of a desired geobody;

determining porosity and/or permeability values for each pair of cells of the earth model;

identifying pairs of cells with porosity and/or permeability values above a threshold value;

generating a first generation geobody, the first generation geobody comprising at least a pair of cells with a porosity and/or permeability value above the threshold value;

filtering the first generation geobody by determining that the first generation geobody comprises a cell count higher than a threshold cell count;

calculating a connectivity score for the first generation geobody using a Euler Characteristic, wherein the Euler Characteristic is associated with the porosity and/or permeability values of the first generation geobodies; and generating a three-dimensional earth model comprising the first generation geobody and an indication of the connectivity score.

12. A computer-implemented method as defined in claim 11, wherein generating the first generation geobody further comprises generating a plurality of first generation geobodies, the method further comprising ranking the plurality of first generation geobodies in relation to one another based on their connectivity scores.

13. A computer-implemented method as defined in claim 11, wherein the connectivity score calculated using the Euler Characteristic comprises numerical ranges of rock physics or mechanical rock properties.

14. A computer-implemented method as defined in claim 11, further comprising determining an inlet to outlet connection between an injector and producer well pair that is connected through a plurality of cells of the first generation geobody.

15. A computer-implemented method as defined in claim 11, further comprising:

detecting entry of a refined filter; and generating a second generation geobody based upon the refined filter.

16. A computer-implemented method as defined in claim 15, wherein the first or second generation geobody is utilized as a target for a wellbore drilling operation.

* * * * *